(No Model.)
F. A. HENNINGER & H. R. DINWIDDIE.
MEASURING TANK.
No. 455,043. Patented June 30, 1891.
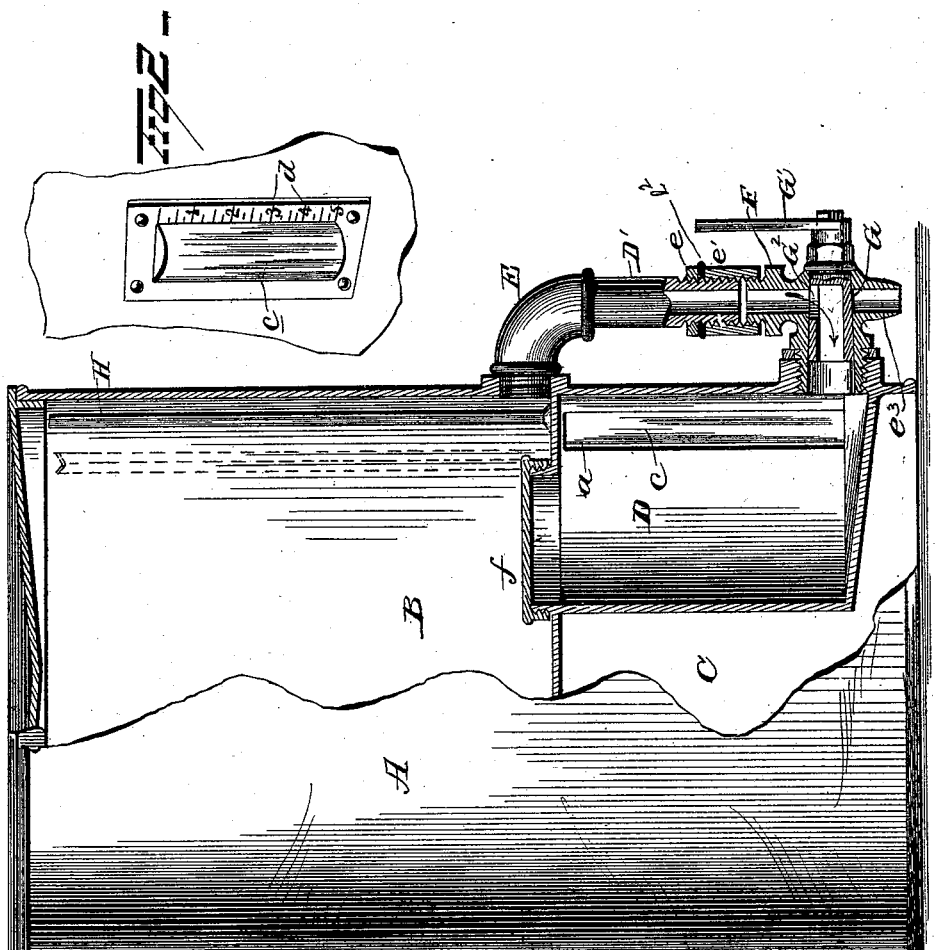

UNITED STATES PATENT OFFICE.

FREDERICK A. HENNINGER AND HENRY R. DINWIDDIE, OF COLUMBIA, MISSOURI.

MEASURING-TANK.

SPECIFICATION forming part of Letters Patent No. 455,043, dated June 30, 1891.

Application filed May 2, 1890. Serial No. 350,288. (No model.)

*To all whom it may concern:*

Be it known that we, FREDERICK A. HENNINGER and HENRY R. DINWIDDIE, of Columbia, in the county of Boone and State of Missouri, have invented certain new and useful Improvements in Measuring-Tanks; and we do hereby declare the following to be a full, clear, and exact description of the invention, such as will enable others skilled in the art to which it appertains to make and use the same.

Our invention relates to an improvement in measuring-tanks for oil, milk, and other liquids, the object being to produce an accurate, safe, easy, and rapid means of transferring liquids from a tank immediately into a receptacle without resorting to the usual set of measurers, thus saving time and preventing evaporation and waste of the liquids.

A further object is to provide a receptacle for containing liquid with a measuring device which shall be simple in construction, effective in operation, and one having no springs or expensive and complicated parts liable to get out of order.

A further object is to so construct a measuring-tank that the use of a pump is obviated, thus avoiding the use of valves and valve-seats, which are liable to wear out and get out of order.

With these objects in view the invention consists in certain novel features of construction and combinations and arrangements of parts, as hereinafter set forth, and pointed out in the claim.

In the accompanying drawings, Figure 1 is a sectional view of a tank having our improvements applied thereto. Fig. 2 is a view of a modified form of gage.

A represents a tank or other receptacle for any desired liquid, made in two compartments B C, the compartment B being adapted for the reception of the liquid and the compartment C being provided with a measure D. In the measure D an elongated slot $a$ is cut, and at opposite sides of said slot guides $b$ are secured for the reception of a strip of glass $c$, which latter is so secured in the guides by means of cement or otherwise that liquid contained in the measure D will not leak out. If desired, the glass $c$ may be made convex and made to project from the surface of the tank, as shown in Fig. 3.

On the exterior of the compartment C, or on a plate secured thereto in close proximity to the glass $a$, a series of graduations $d$ are made, said graduations representing a pint, quart, gallon, &c.; or, if desired, each mark may represent a gallon, thus producing a gage by means of which the amount of liquid drawn from said meter, in a manner presently explained, may be observed.

Communicating with the compartment B in close proximity to its bottom is a pipe or elbow E, which projects through the wall of the compartment immediately over the measure D, and is provided at its lower end with a screw-threaded section of pipe D'. Two screw-threaded collars $e$ $e'$ are screwed on the pipe D' and a washer $e^2$ interposed between said collars. The lower end of the collar $e'$ is adapted to receive the inlet-port of a cock or faucet F, the faucet also communicating with the measure D at its bottom, and is provided with an outlet $e^3$, through which the contents of the meter may be discharged.

Located in the faucet F is a three-way plug-valve G, which projects beyond the faucet and is provided with a key or handle G', by means of which to operate it. The plug-valve is made hollow to produce a port adapted to communicate with the meter D. The valve G is also provided with a port $G^2$, adapted to communicate alternately with the pipe from the main compartment B of the tank and the outlet $e^3$. The plug-valve G normally communicates with the pipe from compartment B, in order that the measure D may always be full. When it is desired to draw off the liquid, the valve will be turned so that the port $G^2$ will align with the outlet to the cock, at which time the liquid in the measure D will flow until the desired amount is drawn off, as seen in the gage.

To permit access to the measure D for cleaning, said meter will be provided with a removable cap or cover $f$. To permit the admission of air to the measure, a pipe H is made to communicate at one end with said measure and terminates at its other end at the top of the tank. If desired, this air-inlet may be made V-shaped, as shown in dotted lines in Fig. 1.

The tank and meter may be made of various sizes to suit the different purposes for which they may be used. With our tank the grocer, having a customer for five gallons of oil, turns the faucet, and in less than sixty seconds the five gallons are transferred into the can, and with a half-turn of the faucet the meter will be filled in still less time. If the operator has four or five gallon-cans to fill, it is not necessary to let the meter refill after supplying each can, supposing the meter to have a capacity of five gallons. After having filled the first of these one-gallon cans the faucet is turned one-fourth to the right or left, and thus suspends all flow from or into the meter, and the next is filled, and so on. Should the meter hold but one gallon, it will refill as rapidly as the operator can change the funnel from one can to another.

In making the meter to hold five gallons we put in a gage that is graduated for four gallons, leaving one gallon in the tank that does not show in the gage. We do this in order to strengthen the lower portion of the tank and protect the glass from too much strain.

A measuring device constructed and arranged as above described is very simple, cheap to manufacture, and effective in operation.

Having fully described our invention, what we claim as new, and desire to secure by Letters Patent, is—

The combination, with a tank divided into compartments, a measure located in one compartment with its upper end secured to and extending through the partition between the two compartments, whereby the measure is held securely braced, and a removable cover on the upper end of the measure, of a pipe leading from the upper compartment to the lower end of the measure, and a valve in the pipe capable of being turned to discharge the contents of the upper compartment into the measure and also constructed to remove the contents of the measure and shut off the feed thereto, substantially as set forth.

In testimony whereof we have signed this specification in the presence of two subscribing witnesses.

FREDERICK A. HENNINGER.
HENRY R. DINWIDDIE.

Witnesses:
J. H. WAUGH,
D. B. CUNNINGHAM.